(12) United States Patent
Lhoest

(10) Patent No.: US 6,851,911 B2
(45) Date of Patent: Feb. 8, 2005

(54) DISTRIBUTING CHUTE CONVEYOR

(75) Inventor: Willy Lhoest, Brussels (BE)

(73) Assignee: Elveco MSJ S.A., Brussels (BE)

( * ) Notice: Subject to any disclaimer, the term of this patent is extended or adjusted under 35 U.S.C. 154(b) by 0 days.

(21) Appl. No.: 10/401,442

(22) Filed: Mar. 26, 2003

(65) Prior Publication Data

US 2003/0194300 A1 Oct. 16, 2003

(30) Foreign Application Priority Data

Mar. 27, 2002 (EP) .............................. 02100309

(51) Int. Cl.⁷ .............................................. B65G 11/06
(52) U.S. Cl. ........................ 414/299; 193/12; 193/46
(58) Field of Search ............................ 193/12, 44, 46; 198/778; 414/299

(56) References Cited

U.S. PATENT DOCUMENTS

| 1,722,675 A | * | 7/1929 | Pardee et al. ................. 193/12 |
| 1,800,067 A | * | 4/1931 | Godinez ..................... 193/12 |
| 1,802,089 A |   | 4/1931 | Pfeiffer |
| 1,928,459 A | * | 9/1933 | Pardee ........................ 193/12 |
| 4,176,997 A |   | 12/1979 | Hungerbach |
| 4,726,546 A |   | 2/1988 | De Angelis |
| 5,083,651 A |   | 1/1992 | Wiese |
| 5,598,914 A |   | 2/1997 | Sulzer et al. |

FOREIGN PATENT DOCUMENTS

| GB | 468 721 | 7/1937 |
| GB | 2 213 806 A | 8/1989 |

* cited by examiner

Primary Examiner—Eileen D. Lillis
Assistant Examiner—Mark A. Deuble
(74) Attorney, Agent, or Firm—Townsend and Townsend and Crew LLP; Gerald T. Gray

(57) ABSTRACT

A helical distributing chute conveyor for a receptacle for transferring loose varied fragile chemical and pharmaceutical products, particularly of the granular or pulverulent type. This chute conveyor, placed in a receptacle, comprises helical chute paths developed about a vertical axis; each chute path, whom cross section is straight, is inclined transversely towards the vertical axis, the angle of inclination of the chute path being calculated such that, whatever their size, the particles of material transported deviate towards the vertical axis when the centrifugal force which originally keeps them on the chute path cancels out or drops below a critical value.

28 Claims, 15 Drawing Sheets

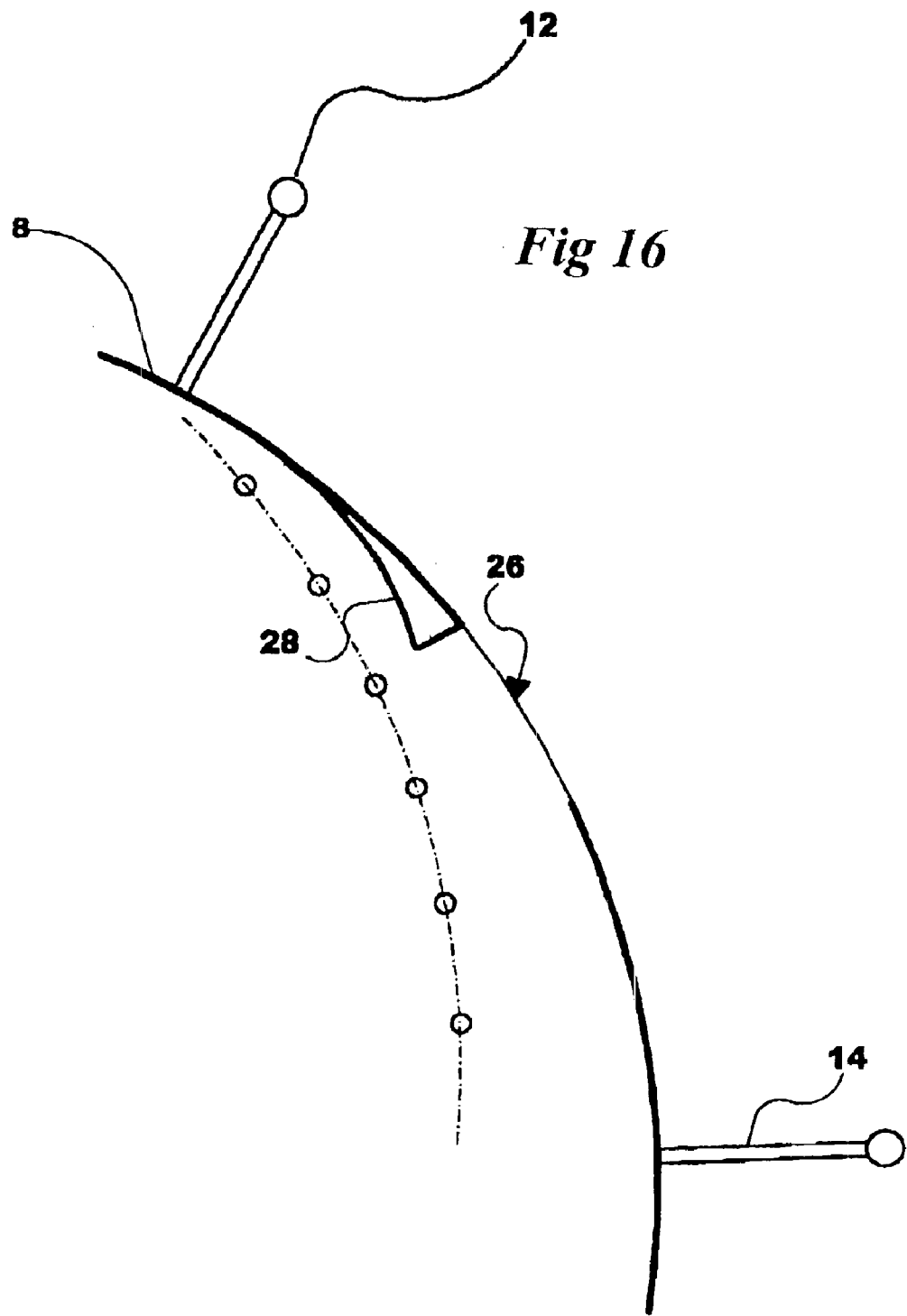

DISTRIBUTING CHUTE CONVEYOR

BACKGROUND OF THE INVENTION

The invention relates to distributing chute conveyors for receptacles for transferring and devices for storing loose varied fragile pharmaceutical or chemical products, essentially for the chemical, pharmaceutical and food industries.

Loose products and items should essentially be understood as meaning fragile products of pulverulent or agglomerated compacted granular structure, particularly items such as tablets of any shape, gelatine capsules, capsules, spansules, pellets, but also products in the form of crystals (such as sorbitol, crystallized into needles), etc.

FIELD OF THE INVENTION

These chute conveyors are used in conjunction with transfer or storage devices. Their utility is that they absorb the kinetic energy of the items or products tipped loose into receptacles or containers, so as to reduce breakage and compaction, these being particularly detrimental particularly in the case of tablets which have complex shapes and/or are fragile (rhomboidal, etc) and/or are angular.

DESCRIPTION OF THE PRIOR ART

GB-468 721, U.S. Pat. No. 1,802,089 or U.S. Pat. No. 4,176,997 disclose devices in the form of a helicoid of similar appearance, these being intended essentially for transferring coal. Even though it is not desirable for lumps of coal to be broken up, these lumps of coal obviously do not have the same kind of fragility as medicinal products. Furthermore, the rates of unloading of coal and those used in the storage of fragile medicinal products obviously have nothing in common.

In the chemical industry too, many manufacturers have opted for helical chute conveyors. These helical chute conveyors are generally developed about a central column (see U.S. Pat. No. 5,598,914, U.S. Pat. No. 4,726,546). Others, such as U.S. Pat. No. 5,083,651 or GB 2 213 806 have developed helical chute conveyors with hollowed out axes. These chute conveyors in cross section have an L-shaped or U-shaped cross section. The hook of the L, forming a chute path, is arranged radially with respect to the axis of the spiral, the branch of the L forming a lateral edging, being arranged substantially parallel to the axis of the helicoid.

The effectiveness of known helical chute conveyors is limited by intrinsic characteristics associated with the shape and size of the products being handled. Thus, the flow behaviour of spherical granules will differ greatly from that of pastilles or rhomboidal capsules. The surface finish of the items also has its part to play. In consequence, each chute conveyor must normally be tailored to a type of product. If it is not, interruptions and heaping-up will occur, and these will limit the usefulness of this kind of device or, ultimately, make its use detrimental, on the one hand because it impedes regular heaping and, on the other hand, because it gives rise to a high percentage of breakages. Chute conveyors of the prior art employ various measures (interruption of the chute path, etc) which are supposed to limit the effect of these phenomena. In addition, as these chute conveyors are very narrow, they cannot act as baffles or supports to distribute the charge better.

Another major disadvantage with the known devices is that they are tailored to just one specific shape of product, and it is therefore necessary to change them for each new production run, otherwise there will be a high percentage of waste.

The object of the invention is to develop a helical transfer chute conveyor which is suited to handling, with a view to storage and transporting in receptacles, a wide variety of products or items and which allows uniform flow and heaping while at the same time limiting the breakage of fragile items.

BRIEF SUMMARY OF THE INVENTION

The subject of the invention is a helical distributing chute conveyor for a receptacle for transferring loose varied fragile pharmaceutical or chemical products, this chute conveyor comprising at least one helical chute path developing about a vertical axis, in which the central volume of the chute conveyor is hollowed out in the form of a well, each chute path is continuous and has substantially constant pitch, each chute path forms a broad plateau the cross section of which is substantially straight, inclined transversely towards the axis, the angle of inclination of the chute path being such that the particles of transferred material, given at the upper part of each helicoid sufficient speed for centrifugal force to keep them along the corresponding chute path, deviate towards the axis when the centrifugal force which holds them on the chute path cancels out or drops below a critical value.

The advantage of this arrangement is that even if the spread on the characteristics of the products is significant, there is no heaping of items along the helicoid: any item which comes to rest when it should not (because of friction, because it has an irregular shape, etc), is removed of its own accord to the central "well". Operating with a broad chute path allows a high flow rate at the same time as substantial support against compaction and crushing. Furthermore, this great chute path width allows the use of a wide variety of products characterized by very wide slip properties.

According to a preferred embodiment, at least one loading device, injecting the product according to its dynamics at a point nearer to or further away from the axis Z, injects the transported product almost tangentially to each chute path at the upper part of each helicoid at sufficient speed that centrifugal force keeps the product along the corresponding chute path.

Advantageously, the angle of inclination $\alpha$ of each helicoid is greater than or equal to the repose angle of the transported product, which ensures uniform filling of the storage volume by overspill over the outer edge of the spiral.

According to a preferred embodiment, the back slope $\alpha$ of each helicoid chute path is slightly less than or equal to the repose angle of the transported product. This makes it possible to relieve the pressure exerted on the products situated at the base of each heap by leaving an empty product space immediately under the plane of the spiral.

According to an advantageous embodiment, the chute conveyor of the invention is equipped with a mechanism for varying transverse inclination $\alpha$ of each chute path.

This device preferably comprises linkages connected to each chute path by articulated links.

This mechanism may in particular comprise linkages of adjustable length.

Each of the helical chute paths may advantageously be equipped with an outer rim. As a preference, the height of this rim decreases from the top downwards. It may be pierced with cut-outs opening onto the space outside the spiral.

In this case, the outer rim is equipped with a deflector upstream of each cut-out.

Another subject of the invention is a bottom-emptied storage, transport and unloading receptacle equipped with a chute conveyor as described hereinabove. The advantage of such a receptacle is that the level of breakage and of crushing of the products is considerably reduced, both during transfer and during transport and storage, because, in particular, the chute conveyor acts as a supporting baffle.

BRIEF DESCRIPTION OF THE SEVERAL VIEWS

Other particulars and advantages of the invention will become apparent from the description hereinafter of some particular embodiments of the invention, reference being made to the appended drawings in which:

FIG. 16 is a detailed plan view of one embodiment of a conveyor according to FIG. 15.

| Numbering of elements discussed in the figures | |
|---|---|
| 2 | Spiral chute path |
| 4 | Well |
| 5 | Product |
| 5a | Large tablets |
| 5b | Small tablets |
| 5c | Gelatine capsules |
| 5d | Rhomboidal tablets |
| 6 | Loading device |
| α | Transverse slope angle |
| β | Longitudinal slope angle |
| δ | Repose angle of the product 5 |
| θ | Angle of loading device |
| 8 | Outer rim |
| 10 | resevoir |
| 12 | Linkages |
| 14 | Articulation |
| 15 | Elastomer block |
| 20 | Slope of heap (mound) of product 5 |

| -continued | |
|---|---|
| Numbering of elements discussed in the figures | |
| 21 | Spacer |
| 22 | Inlet ramp |
| 23 | Orientable disc |
| 24 | Opening for cleaning |

DETAILED DESCRIPTION OF THE INVENTION

Figure 1:
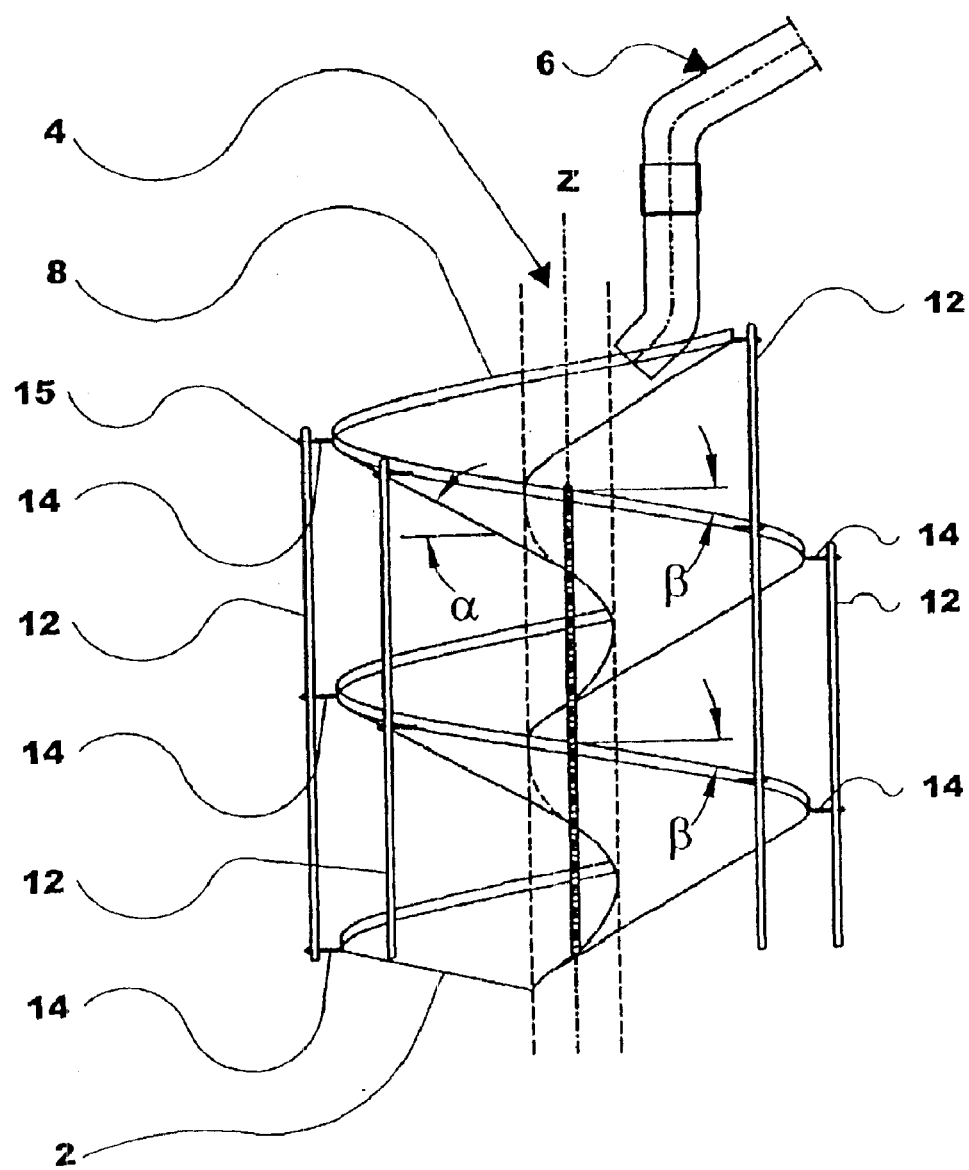
FIG. 1 is a schematic elevation of a chute conveyor according to the invention.

The chute conveyor depicted in FIG. 1 comprises a broad helical chute path 2 developed about a vertical axis Z. This chute path 2 does not extend as far as the axis Z; the centre of the helicoid is hollowed out in the form of a well 4.

A loading device 6 situated above the chute path 2 pours the fragile products or items for storage 5 almost tangentially to the chute path 2, at a given initial speed.

The path of an item or the particle of product 5 tumbling along the chute path 2 is determined by three forces: gravity, which tends to drive it partially along the chute path and partially towards the axis Z, centrifugal force, which tends to move it away from the axis Z, and friction.

Of these three forces, it is the friction which is the most random. Indeed it is rare for the items 5 to be in the ideal shape of perfect spheres. They are more generally in shapes which give rise to a greater degree of spread on dynamic behaviour. This spread on the behaviour is illustrated more visually in FIG. 2. Thus, a tablet in the shape of a thick disc 5a may just as well roll along each edge face at very high speed V1 (at the periphery of the chute path 2) as slide very slowly (with speed V2 ) along one of its faces (near the central axis of the chute conveyor).

Tablets (discs of smaller diameter) 5b will also have a tendency to roll more quickly on the edge face (at the periphery of the chute conveyor), to slide flat at medium speed along the central part of the chute path 2 or to progress more slowly in heaps near the central well 4.

This spread on the characteristics also affects the other shapes of product. Thus in the case of cylindrical gelatine capsules with hemispherical ends 5c, if their axis lies at right angles to that of the chute path, they roll more quickly and therefore have a tendency to deviate towards the periphery) than if their axis is oblique. If their axis is parallel to that of the chute path (the third scenario depicted) they simply slide longitudinally, with a great deal of friction.

Finally, tablets of rhomboidal shape 5d progress at a fairly slow speed through a combination of sliding and cannoning.

The chute conveyor of the invention is designed to considerably reduce the problems associated with such spread.

It is first of all contrived for the items or particles, when they come into contact with the chute path 2, to be given enough speed that centrifugal force keeps most of them on the chute path 2 from the top to the bottom of the chute conveyor. This result is obtained in particular through the presence and design of the loading device 6. In the device 6 depicted in FIG. 1, it is the passage through a vertical pipe of predetermined height H which gives the items the necessary initial speed. Another embodiment, shown in FIGS. 12 and 13, will be described later on.

Figure 3:
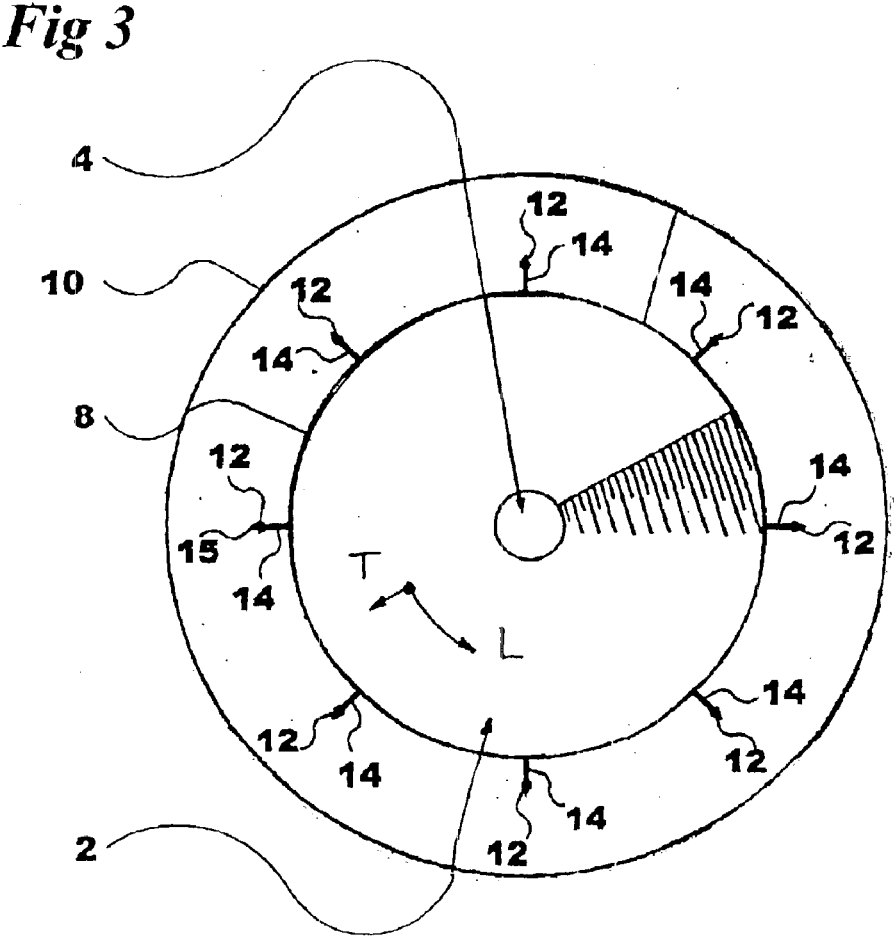
FIG. 3 is a plan view of a storage receptacle equipped with a chute conveyor according to the invention.

The path of an item progressing along the chute path 2 can be broken down into two mutually perpendicular directions as shown in FIG. 3.

A first direction L, known as the "longitudinal" direction follows a helical curve equidistant at every point from the axis Z. This curve L makes an angle β shown in FIG. 1 with a horizontal plane. A second direction T, known as the "transverse direction" is the generatrix of a portion of a cone of central axis Z, tangential to the helicoid, and makes an angle α with a horizontal plane (see FIG. 1).

The two slope angles α and β are associated with the pitch P of the helicoid and the diameter of the chute path 2, as shown in FIGS. 4, 5, 7, 8 and 9.

The respective values of α and β are determined during construction so that when an item 5 slows down or, at the limit, stops, for any reason, it is diverted towards the axis Z and is removed into the central well 4, thus ensuring that it does not itself become an obstacle to the correct conveying of all of the charge and minimizing the droppage height (therefore the percentage of breakages) of fragile products inside the receptacle.

Figure 6:
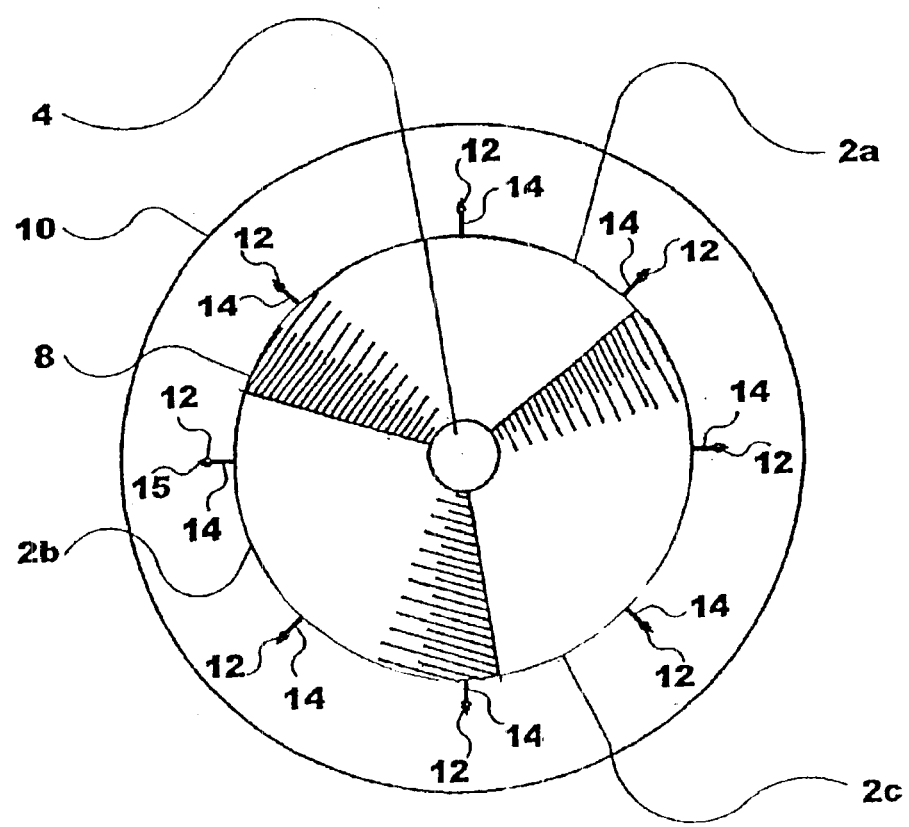
FIG. 6 is a plan view of another form of storage receptacle equipped with a chute conveyor with three chute paths according to the invention.

Although the device depicted in the figures has just one helical chute path 2, it is obvious that two or even three angularly offset chute paths 2a, 2b, 2c can be fitted into the same device without these interfering with one another (see FIG. 6).

Figure 2:
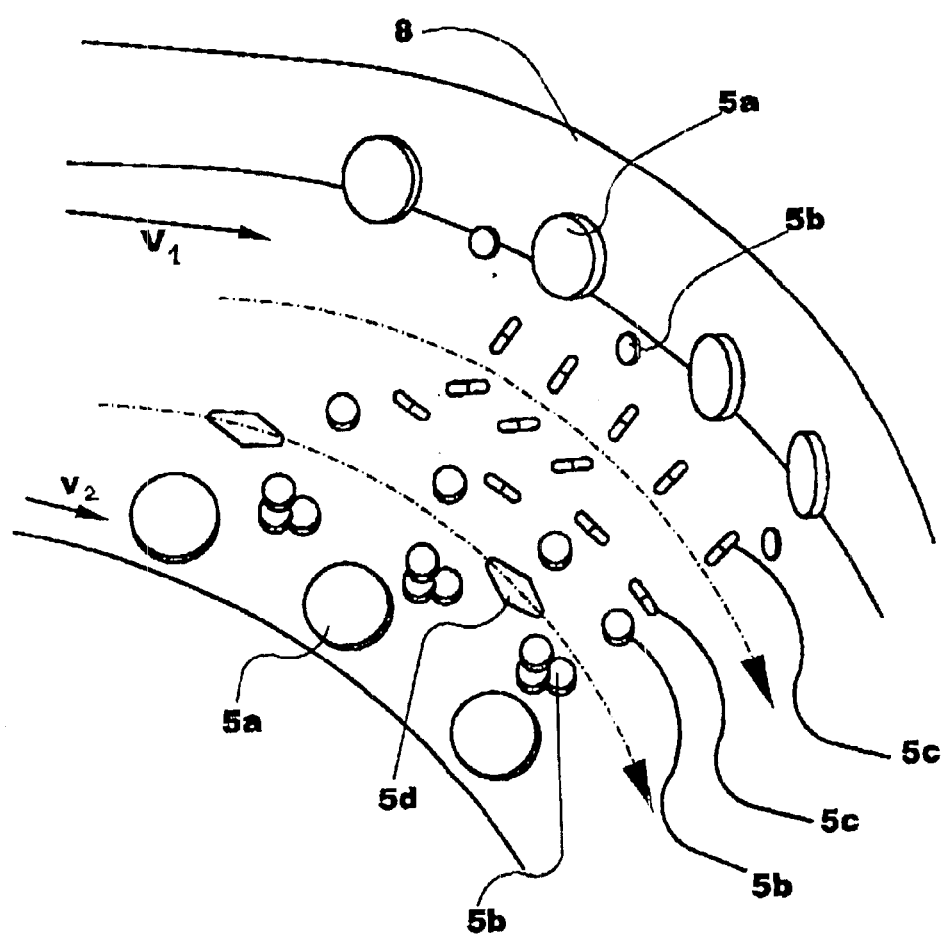
FIG. 2 is a schematic view of the way in which the various products progress along the chute conveyor of the invention.

The chute path 2 depicted in FIGS. 1 and 2 comprises an outer rim 8 intended to limit the outward ejection of excessively fast-moving items or particles.

Figure 15:
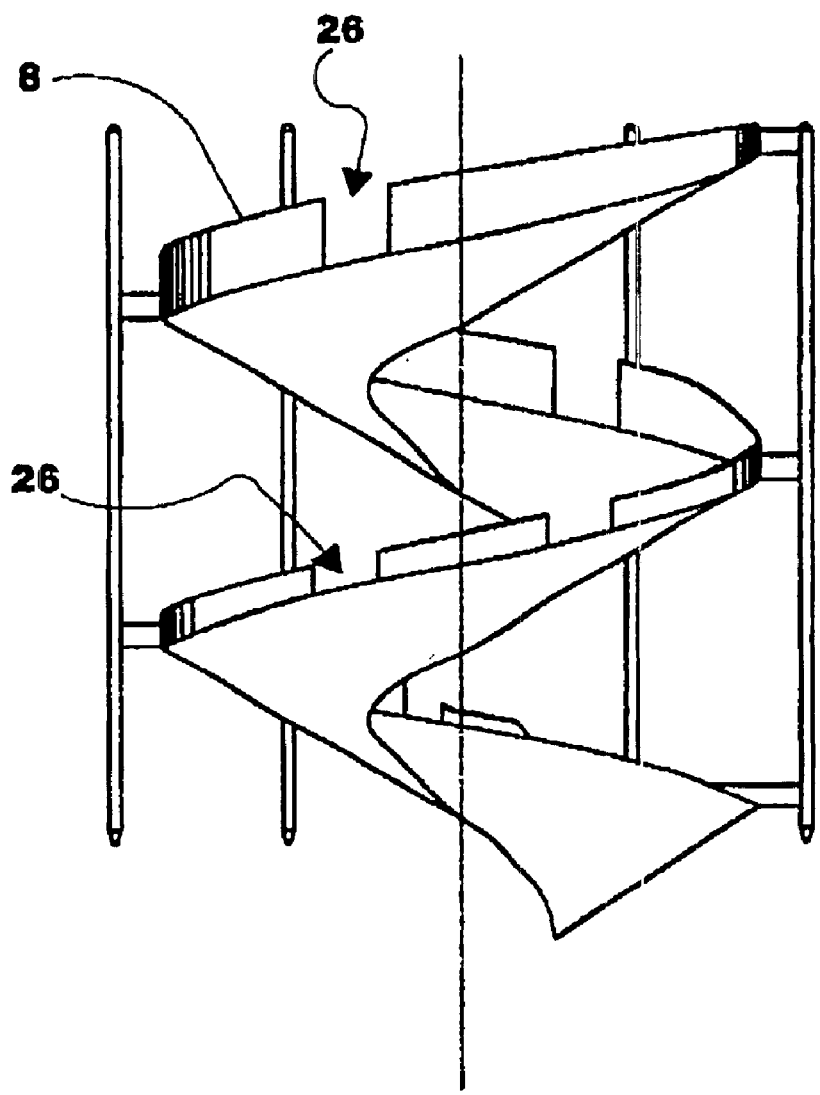
FIG. 15 is an elevation of another embodiment of a chute conveyor, with openings in the lateral edge.

The presence of such a rim 8 is not, however, compulsory and depends essentially on the type of product transported. This rim 8 may be equipped with cut-outs, here and there, to encourage overspill (as shown in FIG. 15) as the receptacle fills.

One of the known disadvantages with helical chute conveyors is that the undersides of the helicoids form "nooks and crannies" that the products or items 5 do not manage to fill. What actually happens (see FIG. 10) is that any heap of items spontaneously at rest adopts a conical shape 20 of which the angle δ, known as the repose angle (or "mound angle") is a characteristic mechanical property. A not insignificant proportion of the storage volume can be lost in this way.

Figure 10:
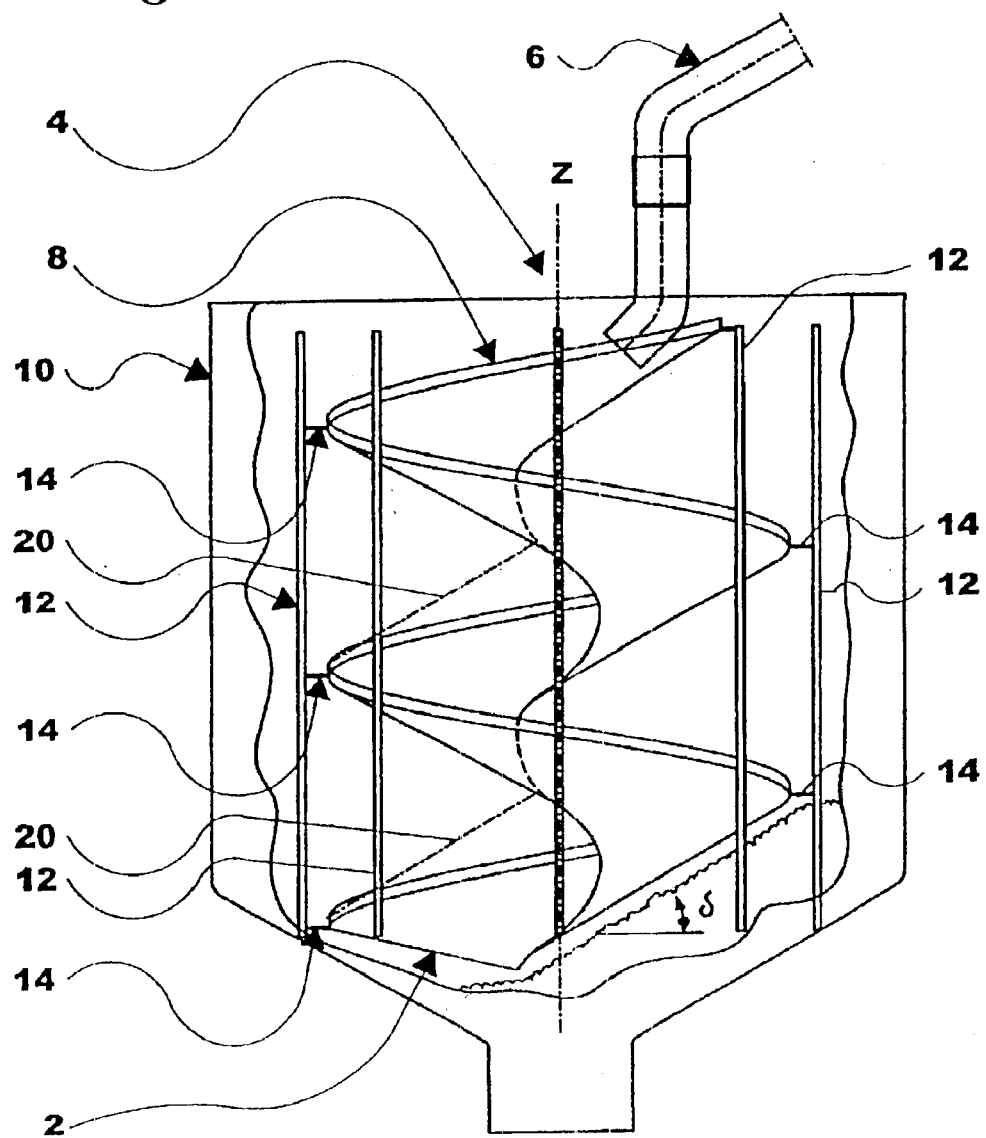
FIG. 10 is an elevation with cutaway of the storage receptacle of FIG. 4 showing the heaping-up of the items.

To avoid this disadvantage, the angle α is given by construction a value greater than or equal to the repose angle δ of the transported products, as shown in FIG. 10. In this way, it is certain that the items or products beginning a heap will fill all the volumes delimited by the undersides of the chute paths 2.

Figure 4:
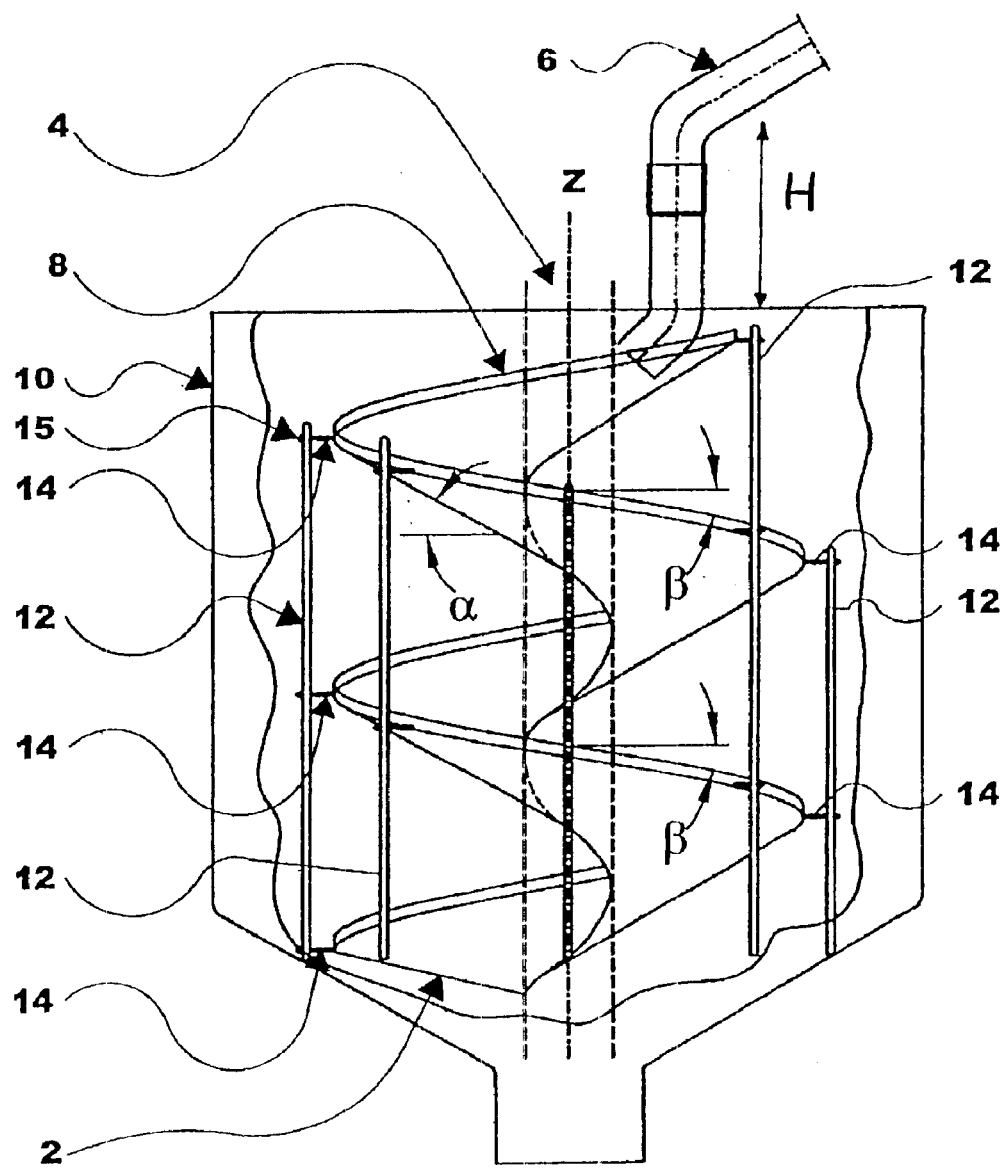
FIG. 4 is an elevation with cutaway of the storage receptacle of FIG. 3.
Figure 5:
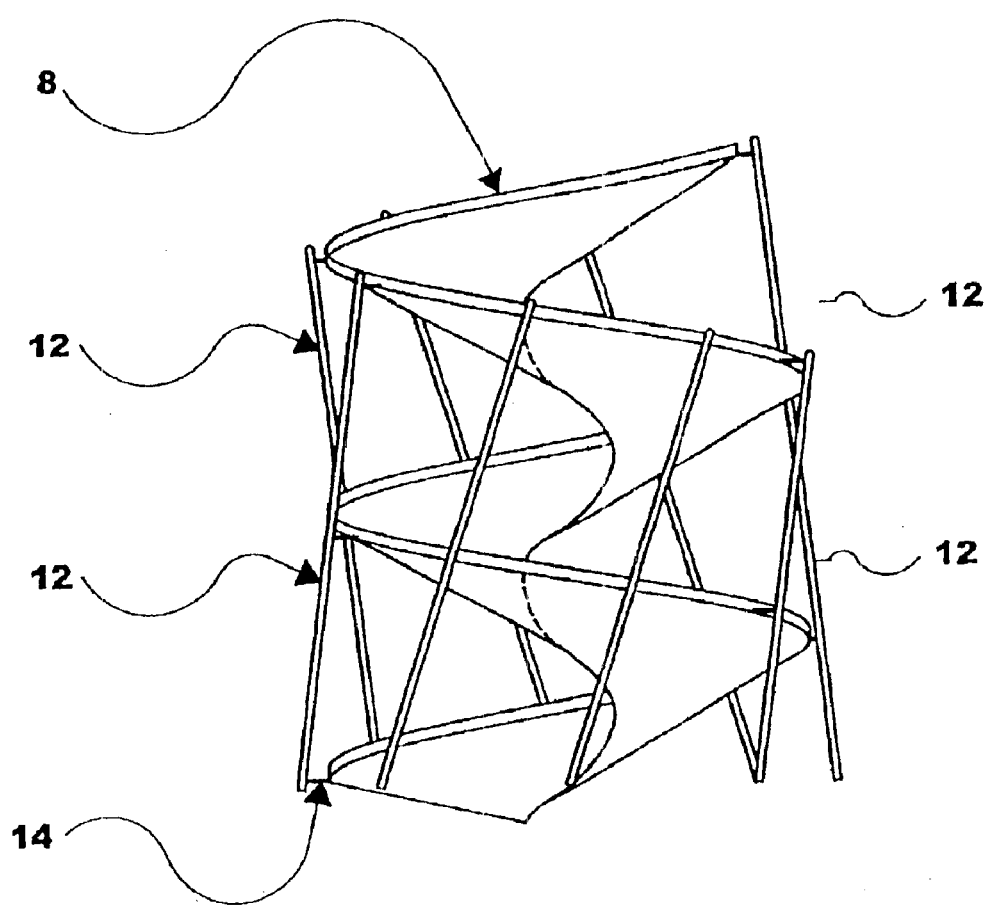
FIG. 5 is a schematic elevation of a chute conveyor of the invention after the angle of the helical chute path has been varied.

As can be seen in FIGS. 3 and 4, the width of the chute conveyor is such that it embraces a volume fairly comparable with that of the storage reservoir 10 in which it is placed. The said receptacle has still to be slightly larger than the spiral so as to leave enough space on the outside of this spiral to allow the product to overspill. Its diameter may actually correspond to 90 or even 95% of the width of the reservoir 10. This arrangement is particularly advantageous for storing and transporting fragile products 5 and items. Indeed, in this case, the chute paths 2 act as baffles, taking most of the weight of the items heaped up therein. Inside the cylinder determined by the chute conveyor, the maximum "pressure" exerted on an item will therefore reach a maximum value corresponding to a height of a "pitch" of the helicoid. In the case of particularly fragile items 5, the angle α will be contrived to have a value slightly less than that of the repose angle δ so as to relieve the mechanical stresses that may result from the elasticity of the helicoid.

The spread on the characteristics of the products or items to be transported is obviously such that it would seem practically impossible to produce a truly universal chute conveyor. The chute conveyor of the invention does, however, make it possible to get as close as possible to this ideal. Indeed, unlike in the prior art, the chute path 2 is, by comparison with the diameter of the chute conveyor, extremely wide, and this already intrinsically allows a wide spread on characteristics to be accommodated (see FIG. 2). Furthermore, this chute path has, in cross section, a practically straight profile. Regardless of their flow characteristics, the products 5 are therefore not mechanically "forced" to adopt a particular path, as would be the case if the cross section were to have a hollow profile, but can follow their spiral path independently of one another. Furthermore, in an advantageous embodiment, the chute paths are supported in such a way that the angles α and β of the chute paths 2 can be modified, which means that the helicoid can be tailored to correspond to characteristics that are optimum for one or other product 5 or type of product 5.

As can be seen in FIGS. 3 and 4, the helical chute path 2 is supported at regular angular intervals by a series of vertically arranged linkages 12. By virtue of a deformable link 14 between these linkages 12 and the edge of the chute path 2, it is possible for all the linkages 12 to be inclined in the same direction with respect to their initial position, thus tightening or expanding the spiral (see FIGS. 5 and 7, 8, 9), the chute paths 2 being made of a material which has a certain ability to be deformed (such as plastics, stainless steel sheet, etc).

Figure 11:
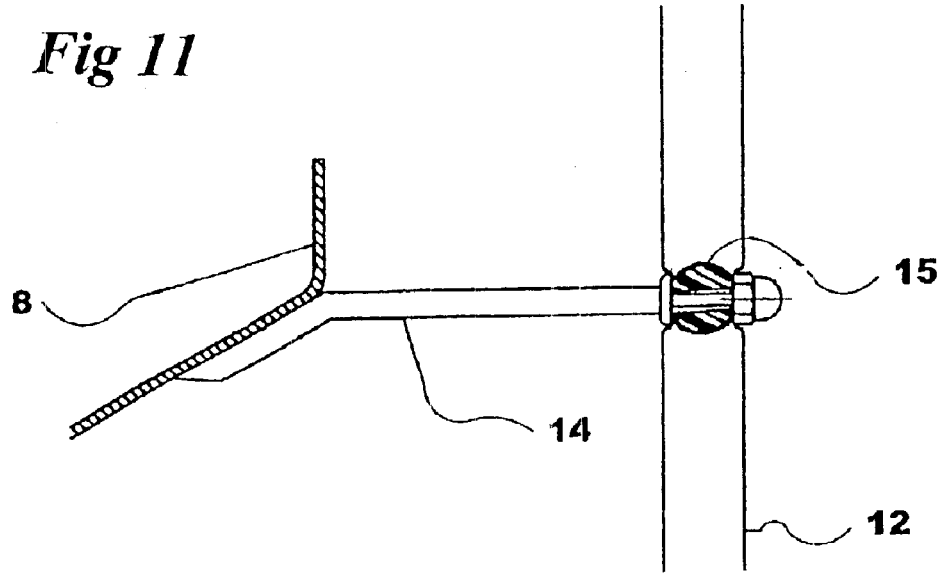
FIG. 11 is a detailed view of the links of the linkages shown in FIG. 4.

Mention may be made, by way of deformable links, of ball joint connections (see FIG. 11) links involving an elastomer block 15, leaves or torsion cylinders.

Figure 7:
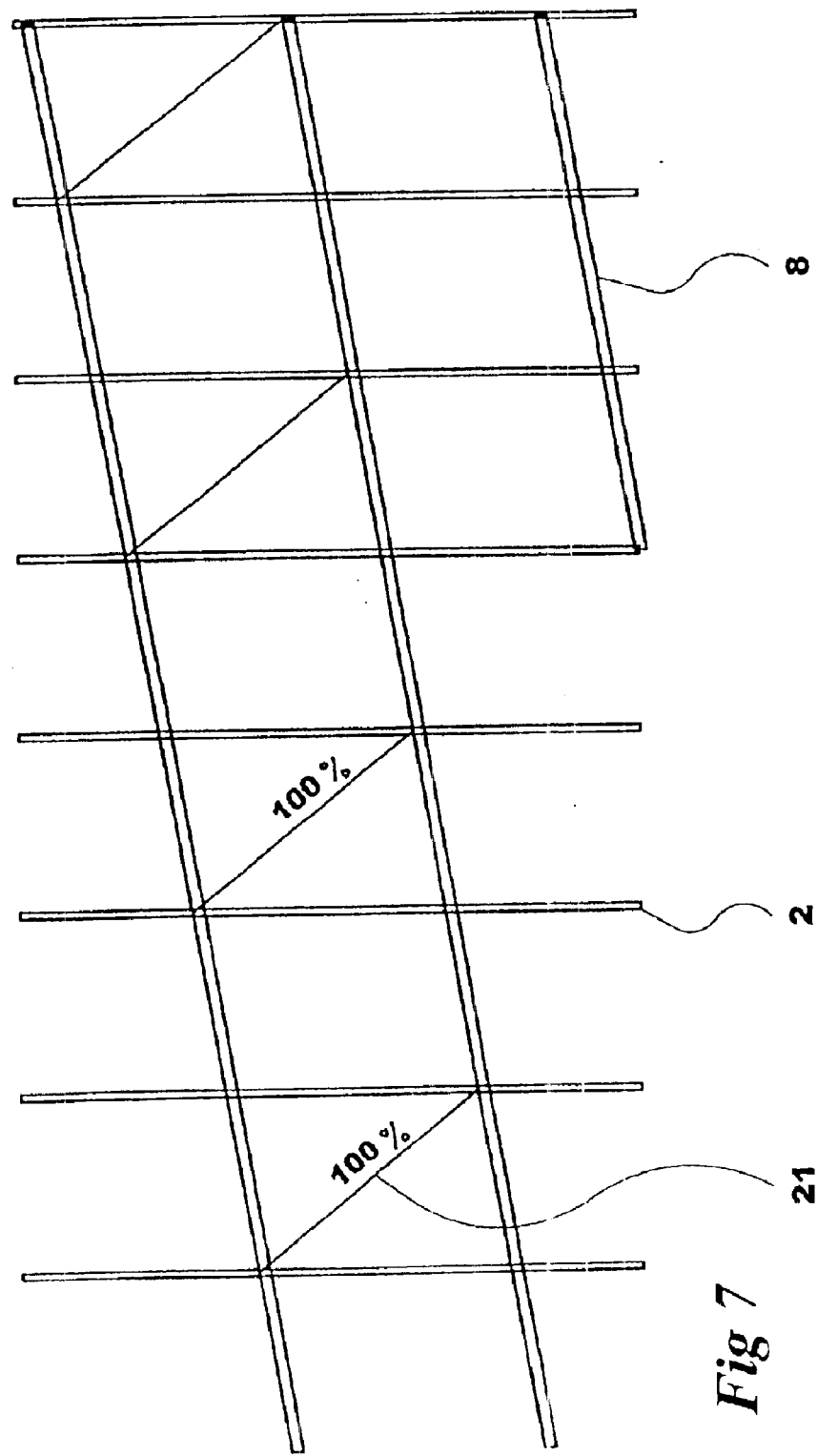
FIGS. 7, 8 and 9 are developed views of the system of linkages of a chute conveyor according to the invention with different angles of inclination.
Figure 8:
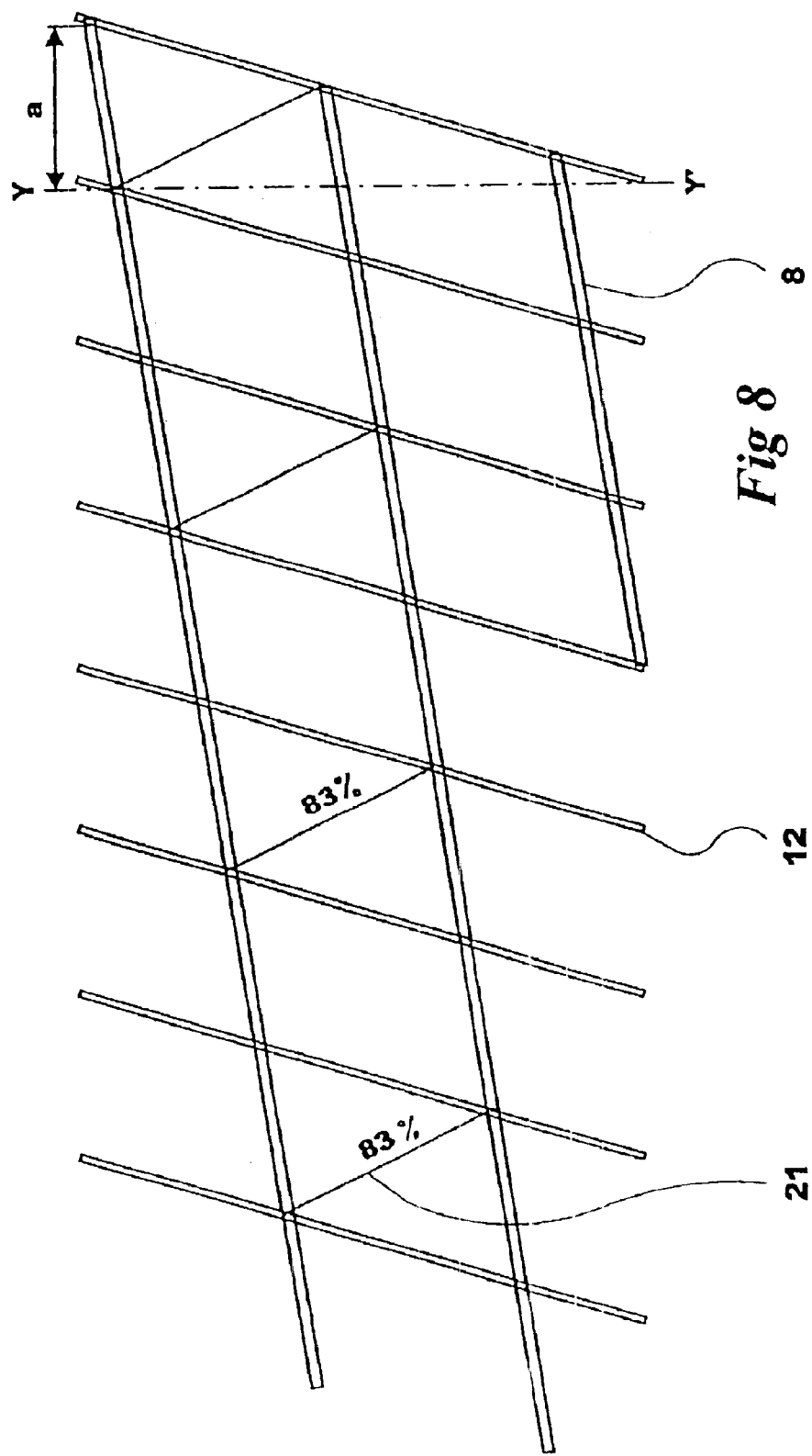
Figure 9:
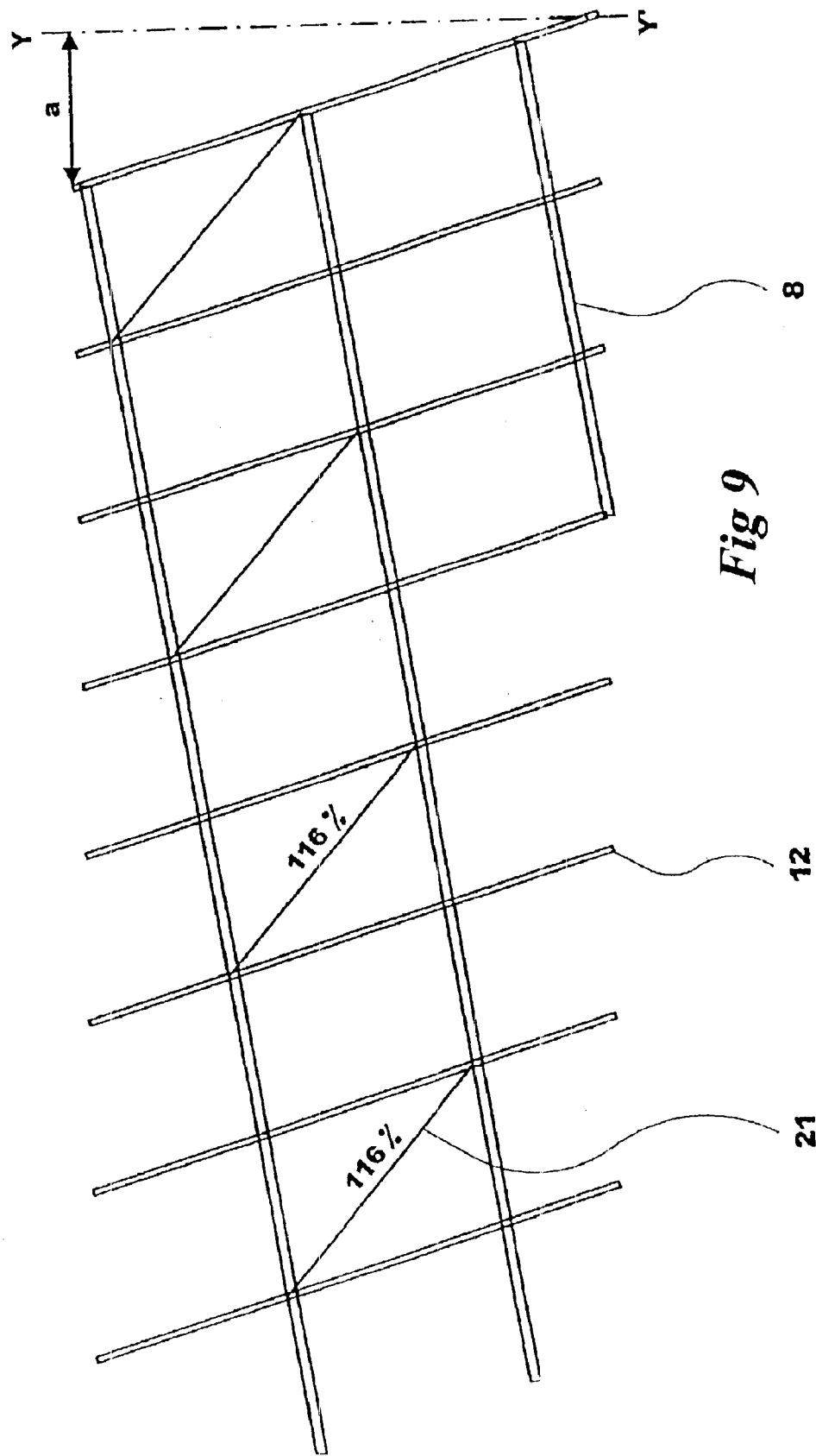

When the appropriate angle of inclination is obtained, spacers 21 immobilize the chute path 2 its support linkages 12 in their respective positions (see FIGS. 7, 8, 9). Tightening the helicoid gives rise to an increase in the angle α, expanding it having the reverse effect. The following table is given by way of example.

| State of helicoid | Diameter | Angle α | Length of spacers 21 |
| --- | --- | --- | --- |
| Tightened | 75 cm | 41.7° | 83% |
| Normal | 80 cm | 37.4° | 100% |
| Expanded | 85 cm | 32° | 116% |

According to another embodiment, it is possible to restrict intervention to a simple varying of the pitch (that is say the distance between the two consecutive turns) by providing linkages formed of elements of variable length (telescopic or interchangeable linkages 12).

Figure 12:
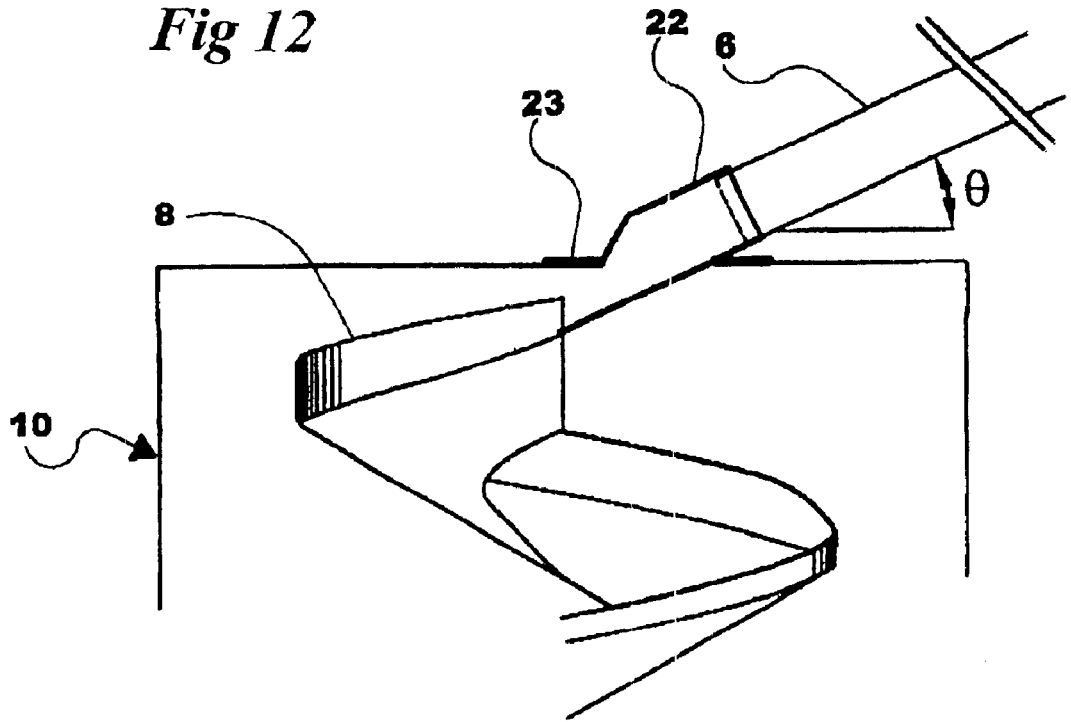
FIGS. 12 and 13 are schematic views, in elevation and in plan respectively, of another form of supply of the storage receptacle.
Figure 13:
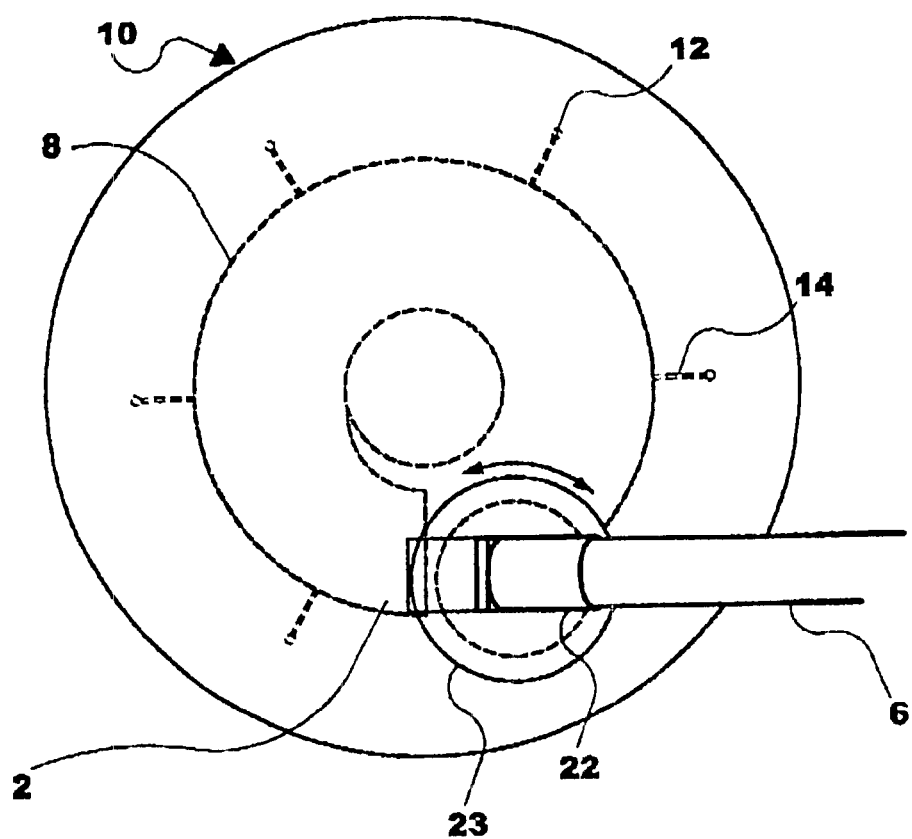

FIGS. 12 and 13 show another embodiment of the device for loading the receptacle, which device allows even better adaptation of the use of the chute conveyor of the invention to suit varied products.

The device depicted here has no vertical section but a ramp 22 inclined by an angle θ which allows the string of transported product to be given the initial speed needed to cause it to run down along the chute conveyor. The angle θ is determined according to the flow characteristics of the items 5.

To initiate the best possible descent of the products across the width of the chute path 2, the lower end of the ramp 22 is arranged so that it can be oriented. In this instance, as shown in FIG. 13, it is inserted on a mouth 23 pivoting in a horizontal plane by virtue of a discoid mounting.

The mouth can therefore be oriented so as to tip certain "slower" products out at the periphery of the chute path 2, and products which flow more rapidly closer to the central well 4.

It will be noted that the presence of a central well 4 considerably eases the cleaning of a reservoir 10 equipped with the chute conveyor of the invention, it being possible for sprinkling elements (heads fitted with nozzles) to be introduced with ease through an appropriate opening 24.

The chute conveyor of the invention is advantageous not only when transferring items into a container, but also as a permanent fixture in a container, because it allows fragile items 5 to be stored in large volumes without causing them to break therein because of the descent at controlled speed, because of the intermediate support (baffle) role played by the chute paths, and because of the fact that points of accumulation during tipping out from the bottom of the container are prevented.

As stated above, the presence of a rim 8 is not in any way indispensable, depending on the type of product transported.

The height of this rim 8 may be very small (5 to 10%) with respect to the width of the chute path 2.

Figure 14:
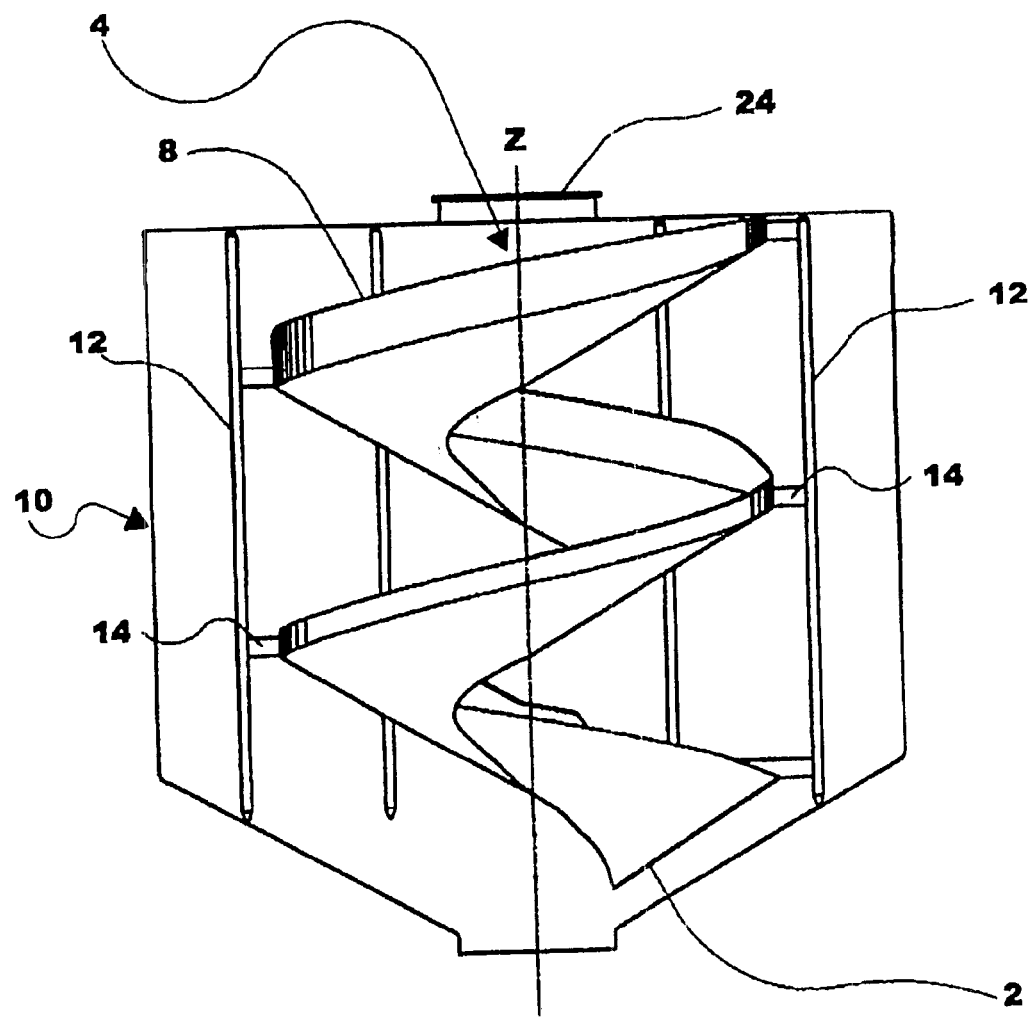
FIG. 14 is a schematic elevation of another embodiment of the chute conveyor of the invention.

When placed in a storage container 10, the essential role of the chute conveyor is to obtain optimum distribution of the product 5 throughout this storage container 10. In consequence, the benefit of having such a rim 8 decreases with the height of the chute conveyor. As shown in FIG. 14, the height of this rim 8 can therefore be reduced gradually in proportion to the decrease in height of the chute conveyor.

This arrangement may be supplemented by the addition of cut-outs 26 encouraging the distribution of the product when filling reaches its end, or in the event of excessive heaping.

In order to prevent the presence of these cut-outs 26 allowing the products 5 with the highest speeds from being ejected too early under the effect of centrifugal force, it is advantageous in this case to provide deflectors 28 along the rim 8 upstream of these cut-outs 26.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A helical distributing chute conveyor for a receptacle for transferring loose varied regularly shaped fragile pharmaceutical or chemical products, this chute conveyor comprising at least one helical chute path developing about a vertical axis, said chute path having an upper side, a back side, a cross-section and a transverse angle of inclination, wherein
    a central volume of the chute conveyor is hollowed out in the form of a well;
    each chute path is continuous and has substantially constant pitch; and
    each chute path forms a broad plateau, which is wide in comparison with a diameter of the receptacle, the cross section of which is substantially straight, inclined transversely towards the axis, the transverse angle of inclination of the chute path being such that the transferred regularly shaped fragile pharmaceutical or chemical products, given at the upper part of each helicoid sufficient speed for centrifugal force to keep them along the corresponding chute path, deviate towards the axis when the centrifugal force which holds them on the chute path cancels out or drops below a predetermined critical value, and
    wherein the chute paths act as baffles, taking most of the weight of the items heaped up therein, the slope of the back side of each helicoid chute path being slightly less than or equal to the repose angle of the transported regularly shaped fragile pharmaceutical or chemical product.

2. A helical transfer chute conveyor according to claim 1, wherein the transverse inclination of each chute path is greater than or equal to the repose angle of a given regularly shaped fragile pharmaceutical or chemical product.

3. A helical transfer chute conveyor according claim 2, which is equipped with a mechanism allowing the transverse inclination of the helicoid chute path to be varied.

4. A helical transfer chute conveyor according to claim 3, wherein this mechanism comprises linkages supporting the helicoid chute paths via articulated links.

5. A helical transfer chute conveyor according to claim 4, wherein this mechanism comprises linkages of adjustable length.

6. A bottom-emptied storage receptacle which is equipped with a helical chute conveyor according to claim 2.

7. A helical transfer chute conveyor according claim 1, which is equipped with a mechanism allowing the transverse inclination of the helicoid chute path to be varied.

8. A helical transfer chute conveyor according to claim 7, wherein this mechanism comprises linkages supporting the helicoid chute paths via articulated links.

9. A helical transfer chute conveyor according to claim 8, wherein this mechanism comprises linkages of adjustable length.

10. A bottom-emptied storage receptacle which is equipped with a helical chute conveyor according to claim 7.

11. A storage receptacle according to claim 10, which comprises at least one loading device which injects transported products almost tangentially to each chute path at an upper part of each helicoid at sufficient speed that centrifugal force keeps the products along the corresponding chute path.

12. A storage receptacle according to claim 11, wherein each loading device comprises a distributing device allowing a given regularly shaped fragile pharmaceutical or chemical product to be injected, depending on its dynamics, at a point closer to or further away from the vertical axis.

13. A helical transfer chute conveyor according to claim 1, wherein each of the helical chute paths is equipped with an outer rim, the height of which is reduced with respect to the width of the respective chute path.

14. A helical transfer chute conveyor according to claim 13, wherein the outer rim is pierced with cut-outs, a deflector being placed upstream of each cut-out.

15. A bottom-emptied storage receptacle which is equipped with a helical chute conveyor according to claim 1.

16. A storage receptacle according to claim 15, which comprises at least one loading device which injects a given regularly shaped fragile pharmaceutical or chemical product almost tangentially to each chute path at an upper part of each helicoid at sufficient speed that centrifugal force keeps the products along the corresponding chute path.

17. A storage receptacle according to claim 16, wherein each loading device comprises a distributing device allowing the product to be injected, depending on its dynamics, at a point closer to or further away from the vertical axis.

18. A helical transfer chute conveyor according to claim 1, wherein each of the helical chute paths is equipped with an outer rim, the height of which decreases along the chute path from a top of the conveyor to a bottom of the conveyor.

19. A helical distributing chute conveyor for a receptacle for transferring loose varied regularly shaped fragile pharmaceutical or chemical products, this chute conveyor comprising at least one helical chute path developing about a vertical axis, said chute path having an upper side, a back side, a cross-section and a transverse angle of inclination, wherein a central volume of the chute conveyor is hollowed out in the form of a well;

each chute path is continuous and has substantially constant pitch;

each chute path forms a broad plateau, the cross section of which is substantially straight, inclined transversely towards the axis, the transverse angle of inclination of the chute path being such that the transferred regularly shaped fragile pharmaceutical or chemical products, given at the upper part of each helicoid sufficient speed for centrifugal force to keep them along the corresponding chute path, deviate towards the axis when the centrifugal force which holds them on the chute path cancels out or drops below a critical value;

each of the helical chute paths includes an outer rim; and wherein the outer rim is pierced with cut-outs, a deflector being placed upstream of each cut-out.

20. A helical distributing chute conveyor for a reseptacle for transferring loose varied regularly shaped fragile pharmaceutical or chemical products, this chute conveyor comprising at least one helical chute path developing about a vertical axis, said chute path having an upper side, a back side, a cross-section and a transverse angle of inclination, wherein a central volume of the chute conveyor is hollowed out in the form of a well;

each chute path is continuous and has substantially constant pitch;

each chute path forms a broad plateau, the cross section of which is substantially straight, inclined transversely towards the axis, the transverse angle of inclination of the chute path being such that the transferred regularly shaped fragile pharmaceutical or chemical products, given at the upper part of each helicoid sufficient speed for centrifugal force to keep them along the corresponding chute path, deviate towards the axis when the centrifugal force which holds them on the chute path cancels out or drops below a critical value; and wherein the chute conveyor further includes a mechanism allowing the transverse inclination of the helicoid chute path to be varied.

21. A helical transfer chute conveyor according to claim 20, wherein the mechanism comprises linkages supporting the helicoid chute paths via articulated links.

22. A helical transfer chute conveyor according to claim 20, wherein the mechanism comprises linkages of adjustable length.

23. A helical transfer chute conveyor according to claim 20, wherein the transverse inclination of each chute path is greater than or equal to the repose angle of the transported product.

24. A helical transfer chute conveyor according to claim 23, wherein the mechanism comprises linkages supporting the helicoid chute paths via articulated links.

25. A helical transfer chute conveyor according to claim 24, wherein the mechanism comprises linkages of adjustable length.

26. A bottom-emptied storage receptacle which is equipped with a helical chute conveyor according to claim 20.

27. A storage receptacle according to claim 26, which comprises at least one loading device which injects transported products almost tangentially to each chute path at an upper part of each helicoid at sufficient speed that centrifugal force keeps the products along the corresponding chute path.

28. A storage receptacle according to claim 27, wherein each loading device comprises a distributing device allowing the product to be injected, depending on its dynamics, at a point closer to or further away from the vertical axis.

* * * * *